INVENTOR.
Naoya Ono
Ryutaro Mori

INVENTOR.
Naoya Ono
Ryutaro Mori

United States Patent Office 3,337,789
Patented Aug. 22, 1967

3,337,789
VARIATION OF CAPACITANCE WITH ANGULAR DISPLACEMENT
Naoya Ono and Ryutaro Mori, Tokyo-to, Japan, assignors to Kabushiki Kaisha Hitachi Seisakusho, Chiyoda-ku, Tokyo, Japan, a joint-stock company
Filed Feb. 1, 1965, Ser. No. 429,591
Claims priority, application Japan, Feb. 10, 1964, 39/6,715; May 28, 1964, 39/29,844
3 Claims. (Cl. 321—24)

This invention relates to devices for converting fine angular displacement constituting a measured quantity into an electrical quantity and more particularly to a device for extracting said displacement as a capacitance variation corresponding thereto.

In general, in the field of industrial instruments, quantities to be controlled are converted into electrical signals and then transmitted through numerous transmission lines to a centralized control room in which there are installed receivers provided respectively for the individual controlled quantities. In such a case, when the controlled quantity is a quantity such as pressure or flowrate, the method whereby the controlled quantity is converted into an angular displacement in proportion thereto and then into an electrical quantity corresponding to this displacement is widely used.

Displacement-to-electrical quantity converters used for such purposes are frequently installed in places subject to mechanical vibration, substantially high surrounding temperature, or corrosive gases. Accordingly, the prime requirement for such devices, of course, is low angular moment for high accuracy. Other requirements are small errors due to mechanical vibration and variation in surrounding temperature, high resistance against chemical corrosion, and, at the same time, low price.

It is a general object of the present invention to provide a new displacement-to-electrical quantity conversion device fulfilling the requirements stated above.

A specific object of the invention is to provide a new displacement-to-electrical quantity converter comprising, essentially, fixed electrode plates disposed symmetrically with a suitable gap therebetween and movable electrode plates capable of undergoing angular displacement relative to the fixed electrode plates, the surfaces of all said electrode plates being coated with a film of a low-friction substance such as fluorocarbon resins, and displacement being detected from the variation in the capacitances between the fixed and movable electrode plates.

Another object is to provide a new displacement-to-electrical quantity converter wherein a fluid substance is placed in an angularly displaceable container to constitute an electrode or a dielectric, thereby to form a capacitor, and displacement is detected from the variation in capacitances in accordance with angular displacement.

A further object is to provide a displacement-to-electrical quantity converter having a circuit whereby the variation in capacitances as stated above is converted into D-C current.

Other objects, as well as the nature, principle, and details, of the invention will be apparent from the following description with respect to preferred embodiments thereof, when taken in conjunction with the accompanying drawings in which like parts are designated by like reference characters, and in which:

FIGURES 1(a) and 1(b) are respectively a perspective view with parts cut away and a half sectional view showing one embodiment of the device according to the invention;

Figure 1A:
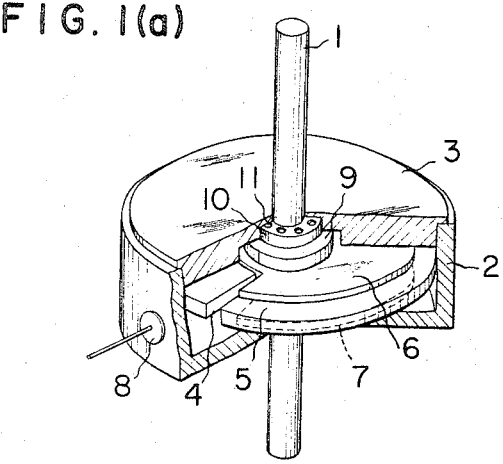
Figure 1B:
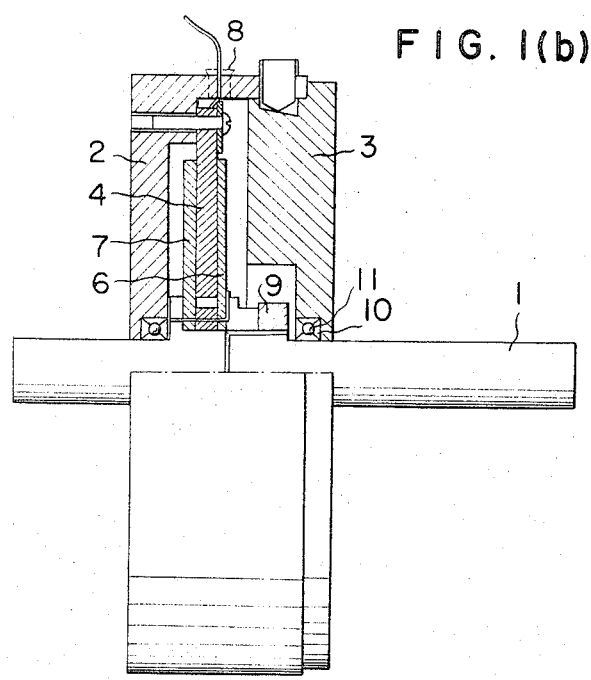

In one embodiment of the invention as shown in FIGURE 1, the device is provided with a rotating shaft 1 which undergoes angular displacement in response to a measured quantity and housing parts 2 and 3 housing electrode plates 4, 5, 6, and 7, a bearing 10 being provided at the contact part between the housing part 3 and the shaft 1, said bearing having in its inner side a ball bearing or a Teflon-coated journal bearing 11.

The electrode plates 6 and 7 are movable electrodes of semicircular shape fixed to the shaft 1, thereby undergoing angular displacement therewith. The connection between these movable electrodes and the shaft 1 is strengthened by a support member 9, which also serves to prevent axial movement of the electrodes 6 and 7. The electrode plates 4 and 5 are fixed electrodes of identical semicircular shape which are respectively fixed to the inner surface of the housing 2 in symmetrically opposed disposition in the same plane. The electrode plates 6 and 7 are disposed with a facing relationship to each other in light contact with the fixed electrodes interposed therebetween, this positional relationship being maintained by spacers of suitable thickness.

The above mentioned electrodes 4, 5, 6, and 7 are respectively provided with low-friction films such as fluorocarbon resins formed on their conductor surfaces. The fixed electrodes 4 and 5 and the movable electrodes 6 and 7 are arranged and formed with spacing consisting of extremely small gaps of certain mean values interrelated to the flatness of the electrode plate surfaces, and the thickness of the above mentioned films, and the gaps between the electrodes are set within specific ranges as described hereinafter.

In actual use, the electrodes 6 and 7 are connected commonly, and the difference between the capacitance produced between the commonly connected movable electrodes and the fixed electrode 4 and the capacitance produced between said movable electrodes and the fixed electrode 5 is extracted. In FIG. 1, the lead wires for leading out the capacitances between the electrodes are not shown, but in the actual device these lead wires are passed to the outside through a lead-wire outlet 8 provided at one part of the housing 2.

The most important feature of the device of the above described construction according to the invention is that wherein the electrodes are coated by a corrosion-resistant and low-friction film such as fluorocarbon resins and arranged to form a capacitor with the film constituting a dielectric material. This construction is advantageous in that, in comparison with conventional devices of this type, for example, a variable capacitor in which an insulating film is merely "interposed" between the electrodes, it affords higher strength to withstand external vibrations and, accordingly, much higher precision.

In the case of an ordinary variable capacitor, since the turning of the knob to adjust the capacitance is done mostly by manual operation, the torque applied to the movable electrode does not pose a very great problem. In the device with which this invention is concerned, however, a large force cannot be obtained from the measured system in many cases, and, moreover, a rapid response is required. Accordingly, it is necessary to reduce the torque of the movable parts. The device of the invention has the advantageous characteristic of low frictional resistance between the movable electrodes and stationary electrodes and, therefore, of rapid response, since electrodes covered with a film such as a fluorocarbon resin are used as described above.

Figure 2:
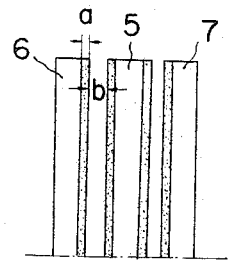
FIGURE 2 is a sectional view showing electrode plates of the device shown in FIGURE 1.

The thickness $a$ of this film is relatively determined by its interrelation with the gap $b$ between the electrodes. Referring to FIG. 2 which is a simplified diagram showing the electrodes of the device of the invention, the capacitance C of the electrode group between the electrodes 6 and 7 commonly connected and the electrode 5 may be represented by the following equation.

$$C = \frac{\epsilon s}{a} \left\{ \frac{1}{1 + \frac{\epsilon}{\epsilon'} \frac{b}{2a}} \right\} \quad (1)$$

where:

S is the area of confrontal overlap of the electrodes;
$\epsilon$ is the dielectric constant of the film; and
$\epsilon'$ is the dielectric constant of the substance constituting the gaps.

The required capacitance C is determined by the performance of the circuit which converts this capacitance C into an electrical signal and, ordinarily, is required to be 20 pF or higher. Considering that a low-friction film, for example, Teflon, is used, the value of $\epsilon$ can be taken to be of the order of from 2 to 10. Although the area S, which relating to limit of size differs with the application, a value in the range of from 2 to 300 cm.$^2$ may be considered to be ample in the field of industrial measurements. Although a large increase in inertia with respect to a slight deviation in the gap $b$ is undesirable, it is necessary to use a value of the order of from 0.005 to 1.000 mm. when the finish precision of the electrode plates is considered. Furthermore, because of conditions such as fabrication technique and servicable life, the thickness $a$ of the film must be selected to lie in the range of approximately 0.02 to 10.00 mm.

When the various above stated conditions are considered, it is found that the suitable ratio of the film thickness $a$ to the gap $b$ is $2 \times 10^4$ to $2 \times 10^{-2}$.

In the capacitor formed in the above described manner, the movable electrodes 6 and 7 are firmly fixed to the shaft 1 and cannot be changed in their mutually relative positions, and the film, moreover, being made of a substance such as Teflon, has resistance against wear and erosion and is so formed as to exhibit absolutely no change in its characteristics. Therefore, the characteristic of this device becomes principally only the deviation $\delta$ of the gap between the movable and stationary electrodes. The error in this case may be expressed by the following equation.

$$\frac{\Delta C}{C} = \frac{\left\{ \frac{\frac{\epsilon}{2a}}{1 + \frac{\epsilon}{\epsilon'} \frac{b}{2a}} \cdot \delta \right\}^2}{1 - \left\{ \frac{\frac{\epsilon}{2a}}{1 + \epsilon \frac{b}{2a}} \cdot \delta \right\}^2} \quad (2)$$

wherein $\Delta C$ is a variant of capacitance C.

In actual designing of the device, the finish precision of the electrode plate which can be realized and the deviation $\delta$ which can be expected therefrom are evaluated, and the ratio $b/a$ is so determined that the error $\Delta C/C$ becomes less than the allowable value. Then the values of $a$ and $b$ are determined with consideration of the entire configuration.

By sealing an insulating liquid ($\epsilon'$) in the gaps between the electrodes in the device of the above described construction, it is possible to reduce further the error in C due to constructional deviations of the electrodes.

It will be obvious that the principle of the present invention can be applied to also the case where linear displacement detection is carried out through the use of electrodes of shapes such as bar shapes and tubular shapes.

Figure 3:
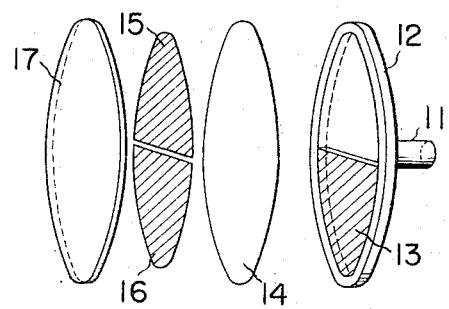
FIGURE 3 is an exploded, perspective view showing another embodiment of the invention.

In another embodiment of the invention as shown in FIGURE 3, which is an exploded view for more clearly showing the construction, there is provided a rotatable shaft 11 fixed to the center of one surface of a container 12 in which an electrically conductive liquid 13 is sealed in. The container 12 has a circular cross section perpendicular to the axial direction, the liquid 13 being sealed in therewithin in the form of a semicircle, and the surface of the container 12 opposite the shaft 11 being closed by a thin insulating plate 14. Metal electrode plates 15 and 16 of thin semicircular shape are bonded onto the thin plate 14, and a side plate 17 is formed on the outer side of the electrode plates 15 and 16.

In the device of the above described construction, the thin insulating plate 14 has a thickness of 0.1 mm. or less and is made of a substance with small variation in dielectric constant with temperature variation such as Teflon, diallylphthalate, or a polycarbonate. The electrodes can be readily fabricated with high precision by etching polymer-metal laminates of very low price made by injection coating. These electrodes can be formed also by evaporation deposition or printing of metal on the thin plate 14. For the conductive liquid, it is preferable to resort to a measure such as adding thereto a surface activator or to improve the liquid repellent property of the surface of the parts which the liquid is to contact by surface treatment so as to reduce the error of liquid level indication due to causes such as surface tension.

When the shaft 11 is angularly displaced, the electrodes 15 and 16 also are angularly displaced accordingly, but the conductive liquid 13 is always in the same position irrespective of this rotation. Consequently, the capacitances between the liquid 13 and the electrode 15 and between the liquid 13 and the electrode 16 vary in accordance with the rotational angle of the shaft 11. Therefore, it is possible to detect angular displacement from the above described variation in capacitance.

This device has the advantages of simple construction and easy manufacture. As described above with respect to examples of the invention, angular displacement is converted into capacitance and then further converted into a quantity such as D-C current by a circuit such as that described hereinbelow as one example.

Figure 4:
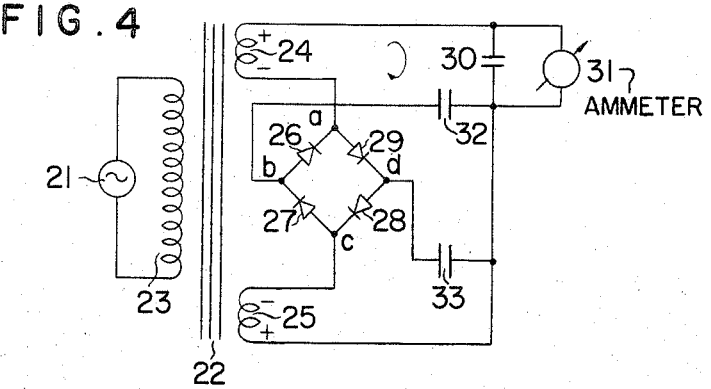
FIGURE 4 is a circuit diagram of a circuit for obtaining D-C current proportional to capacitance.
Figure 5:
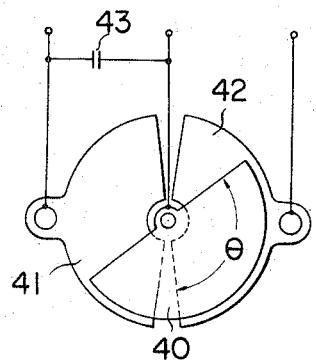
FIGURE 5 is a schematic diagram of wiring connections of an electrode plate which is equivalent to the circuit shown in FIGURE 4.

Referring to FIGURE 4, its operation is substantially the same as disclosed with respect to FIGURE 5 in assignee's application Ser. No. 404,066, now Patent No. 3,302,459 filed Oct. 15, 1964, naming one of the present applicants as co-inventor. The circuit shown therein is provided with an A-C signal generator 21 consisting of, for example, a transistorized Hartley oscillator, and a transformer 22 having a primary winding 23 and secondary windings 24 and 25. Diodes 26, 27, 28, and 29 are connected in a bridge arrangement, the junction $b$ between diodes 26 and 27 and the junction $a$ between diodes 26 and 29 being connected by way of a series connection of the secondary winding 24, a filter capacitor 30, and a capacitor 32 the capacitance of which varies in accordance with angular displacement, and the junction $c$ between diodes 27 and 28 and the junction $d$ between diodes 28 and 29 being connected by way of a series connection of the secondary winding 25 and a capacitor 33 whose capacitance varies in accordance with the angular displacement.

The capacitor 32 equivalently represents the capacitance of the electrodes of the device shown in FIGURE 1 or the capacitance of the liquid body 13 and the electrode 16 of the device shown in FIGURE 3. The capacitor 33 equivalently represents the capacitance of the electrodes of the device shown in FIGURE 1 or the capacitance of the liquid body 13 and the electrode 15 of the device shown in FIGURE 3.

If the above described converters are simplified, and only the electrode parts are considered, the resulting device may be represented as indicated in FIGURE 5. This device has a movable electrode 40 which corresponds to electrode 6 or liquid body 13 in FIGURES 1 and 3, respectively, a stationary electrode 42 which corresponds to electrodes 5 or 16, and an electrode 41 which corresponds to electrodes 4 or 15. The operation of the circuit shown in FIGURE 4 will now be described with reference to FIGURE 5.

The signal generator 21 in FIGURE 4 generates a signal $e = E \sin \omega t$. The operation will be considered for the conditions of: number $N_1$ of turns of the primary winding 23; number $N_2$ of turns of each of the secondary windings 24 and 25; mutual opposite directions of voltages produced in secondary windings 24 and 25 as shown; and capacitances $C_1$ and $C_2$ of capacitors 32 and 33, respectively.

Then, when a voltage of a polarity as shown is produced in the secondary winding 24, a current $i_1$ flows from the winding 24 in the arrow direction through the filter capacitor 30 and an ammeter 31, the capacitor 32, and the diode 26. This current $i_1$ is given by the following equation.

$$i_1 = \frac{N_1}{N_2} E \omega C_1 \cos \omega t \quad (3)$$

When the polarity of the voltage generated in the winding 24 is inverted, a current $i_2$ flows in the direction opposite to that of the arrow from the winding 24 through the diode 29, capacitor 33, and ammeter 31. The current $i_2$ in this case is given by the following equation.

$$i_2 = \frac{N_1}{N_2} E \omega C_2 \cos \omega t \quad (4)$$

The paths of the currents which are caused to flow by voltages generated in the secondary winding 25 may be similarly and readily considered.

Since the current $i$ flowing through the ammeter 31 is smoothed by the filter capacitor 30, it may be represented by the mean value of the currents expressed by Equations 3 and 4. That is, this current $i$ flowing through the ammeter 31 may be expressed as follows:

$$i = \frac{1}{2\pi} \int_{-\pi}^{\pi} \frac{N_2}{N_1} E \omega (C_1 - C_2) \cos \omega t \, d(\omega t)$$

$$= \frac{1}{\pi} \frac{N_2}{N_1} E \omega (C_1 - C_2) \quad (5)$$

The capacitances $C_1$ and $C_2$ of the capacitors 32 and 33 vary in the following manner in accordance with the rotation $\theta$ of the variable electrode 40 shown in FIGURE 5.

$$\left. \begin{array}{l} C_1 = K\theta \\ C_2 = C_m - K\theta \end{array} \right\} \quad (6)$$

where:

K is a proportionality constant;
$C_1$ denotes the capacitance of electrodes 40 and 41;
$C_2$ denotes the capacitance of electrodes 40 and 42; and
$C_m$ denotes the maximum capacitance between electrodes 40 and 42.

If a capacitor 43 having a capacitance $C_g$ is now connected between the electrodes 40 and 41, Equation 6 will become as follows:

$$\left. \begin{array}{l} C_1 = K\theta + C_g \\ C_2 = C_m - K\theta \end{array} \right\} \quad (7)$$

By substituting this equation in Equation 5, the following equation is obtained.

$$i = \frac{1}{\pi} \frac{N_2}{N_1} E \omega \{2K\theta + (C_g - C_m)\} \quad (8)$$

If, here, the capacitance $C_g$ is selected to be $C_g = C_m$, the following equation will be obtained.

$$i = \frac{1}{\pi} \frac{N_2}{N_1} E \omega \cdot 2K\theta = K'\theta \quad (9)$$

wherein $$K' = \frac{2K \cdot \omega E N_2}{\pi N_1} \quad (10)$$

From this result, it can be observed that the current flowing through the current meter (ammeter) 31 is proportional to the angular displacement $\theta$.

In the displacement-to-electrical quantity converting device according to the invention as described above, since the operational requirement is that the mutually relative positions of opposed electrodes be displaced in accordance with an angular displacement, either of the electrodes may be selected to be the movable electrode.

It will be obvious, furthermore, that the circuit for obtaining an output current which is proportional to the difference between capacitances is not limited to that shown for illustrative purpose in FIGURE 4.

Since numerous changes may be made in the above described construction, and different embodiments of the invention may be made without departing from the spirit and scope thereof, it is intended that all matter contained in the foregoing description or shown in the accompanying drawings shall be interpreted as illustrative and not in a limiting sense.

What we claim is:

1. A device for converting displacement into electrical quantity comprising a rotatable shaft for undergoing angular displacement in accordance with a measured quantity, a container of hollow cylindrical shape coaxially coupled to said shaft, an electrically conductive liquid occupying approximately one half of the interior space of said container, two metal plate electrodes each of semicircular planar shape symmetrically disposed on opposite sides of the container axis to confront said conductive liquid, a dielectric film material interposed between said conductive liquid and said electrodes, an end plate for protecting said electrodes, and means to detect capacitances between said conductive liquid and said electrodes.

2. A device for converting displacement into electrical quantity as set forth in claim 1, wherein the capacitances between the conductive liquid and the metal plate electrodes are converted into D.C. current by a circuit comprising an A.C. signal generator, a transformer receiving on its primary side the output of said generator and having at least one pair of secondary windings, diodes connected in bridge arrangement, said secondary windings being wound to produce voltages of mutually opposite direction and being connected in series to diagonally opposite node junctions of said bridge arrangement, said conductive liquid and said electrodes forming two capacitors connected in series to the other diagonally opposite node junctions of said bridge arrangement, and, moreover, the junction between said capacitors being connected to the junction between the two secondary windings.

3. A device for converting displacement into electrical quantity comprising a rotatable shaft for undergoing angular displacement in accordance with a measured quantity, a first electrode of semicircular planar shape consisting of a metal plate with a low-friction film formed over its surface, two second electrodes of semicircular planar shape disposed in one plane to confront said first electrode with a gap therebetween and each consisting of a metal plate with a low friction film formed over its surface, the ratio of the thickness of said films formed on the electrodes to the mean gap between the confronting electrodes being $2 \times 10^4$ to $2 \times 10^{-2}$, means to cause variation, in accordance with the rotation of said rotatable shaft, of the mutually relative position of said confronting first and second electrodes, a housing for enclosing said electrodes, and means to derive variation of capacitances between said first electrode and said second electrodes.

References Cited

UNITED STATES PATENTS

| | | | | |
|---|---|---|---|---|
| 2,116,080 | 5/1938 | Parker | | 323—93 X |
| 2,361,657 | 10/1944 | Schock | | 317—249 |
| 2,548,790 | 4/1951 | Higinbotham et al. | | 340—200 |
| 2,593,766 | 4/1952 | Kimball et al. | | 324—61 |
| 2,614,171 | 10/1952 | Fein. | | |
| 3,202,889 | 8/1965 | Matsui | | 317—249 |
| 3,205,417 | 9/1965 | Maeda | | 317—249 |

JOHN F. COUCH, *Primary Examiner.*

A. D. PELLINEN, *Assistant Examiner.*